US009154782B2

(12) United States Patent
Novotny

(10) Patent No.: US 9,154,782 B2
(45) Date of Patent: Oct. 6, 2015

(54) APPARATUSES AND METHODS FOR ADJUSTING COEFFICIENTS USING DEAD ZONES

(71) Applicant: Magnum Semiconductor, Inc., Milpitas, CA (US)

(72) Inventor: Pavel Novotny, Waterloo (CA)

(73) Assignee: Magnum Semiconductor, Inc., Milpitas, CA (US)

( * ) Notice: Subject to any disclaimer, the term of this patent is extended or adjusted under 35 U.S.C. 154(b) by 45 days.

(21) Appl. No.: 14/028,156

(22) Filed: Sep. 16, 2013

(65) Prior Publication Data

US 2015/0078440 A1  Mar. 19, 2015

(51) Int. Cl.
| G06K 9/00 | (2006.01) |
| G06K 9/46 | (2006.01) |
| H04N 19/124 | (2014.01) |
| G06T 9/00 | (2006.01) |
| H04N 19/136 | (2014.01) |
| H04N 19/18 | (2014.01) |
| H04N 19/60 | (2014.01) |

(52) U.S. Cl.
CPC ............ *H04N 19/0009* (2013.01); *G06T 9/004* (2013.01); *G06T 9/005* (2013.01); *G06T 9/007* (2013.01); *H04N 19/00139* (2013.01); *H04N 19/00296* (2013.01); *H04N 19/00775* (2013.01); *H04N 19/124* (2014.11); *H04N 19/136* (2014.11); *H04N 19/18* (2014.11); *H04N 19/60* (2014.11)

(58) Field of Classification Search
CPC ......... G06T 9/004; G06T 9/005; G06T 9/007; H04N 19/60–19/62; H04N 19/625; H04N 19/124; H04N 19/20

USPC .................. 382/248, 250, 251, 276
See application file for complete search history.

(56) References Cited

U.S. PATENT DOCUMENTS

| 5,627,916 | A  | * | 5/1997 | Horiuchi ....................... 382/239 |
| 5,937,101 | A  | * | 8/1999 | Jeon et al. ..................... 382/268 |
| 6,157,676 | A  | * | 12/2000 | Takaoka et al. .......... 375/240.13 |
| 7,092,577 | B2 | * | 8/2006 | Kuniba ......................... 382/239 |
| 7,483,058 | B1 | * | 1/2009 | Frank et al. ................. 348/222.1 |
| 7,620,103 | B2 | * | 11/2009 | Cote et al. ................ 375/240.03 |
| 7,778,476 | B2 | * | 8/2010 | Alvarez et al. ................ 382/236 |
| 8,050,331 | B2 | * | 11/2011 | Lelescu et al. ........... 375/240.29 |
| 8,498,335 | B2 | * | 7/2013 | Holcomb et al. ........ 375/240.03 |
| 2008/0013633 | A1 | | 1/2008 | Ye et al. |
| 2010/0158105 | A1 | | 6/2010 | Garg et al. |
| 2012/0134412 | A1 | | 5/2012 | Shibahara et al. |
| 2013/0114669 | A1 | | 5/2013 | Karczewicz et al. |

FOREIGN PATENT DOCUMENTS

WO      2013109471 A1    7/2013

OTHER PUBLICATIONS

International Search Report and Written Opinion for International Application No. PCT/US2014/054691 mailed on Jan. 2, 2015.

* cited by examiner

*Primary Examiner* — Kanjibhai Patel
(74) *Attorney, Agent, or Firm* — Dorsey & Whitney LLP

(57) ABSTRACT

Apparatuses and methods for adjusting coefficients for use in video encoding are described. An example apparatus may include an encoder that may be configured to receive transform coefficients and adjust selected ones of the transform coefficients (e.g. reset the selected ones to zero) based on a comparison with a threshold. The adjusted coefficients may then be quantized, which may result in effectively increasing a QP range of the encoder.

18 Claims, 4 Drawing Sheets

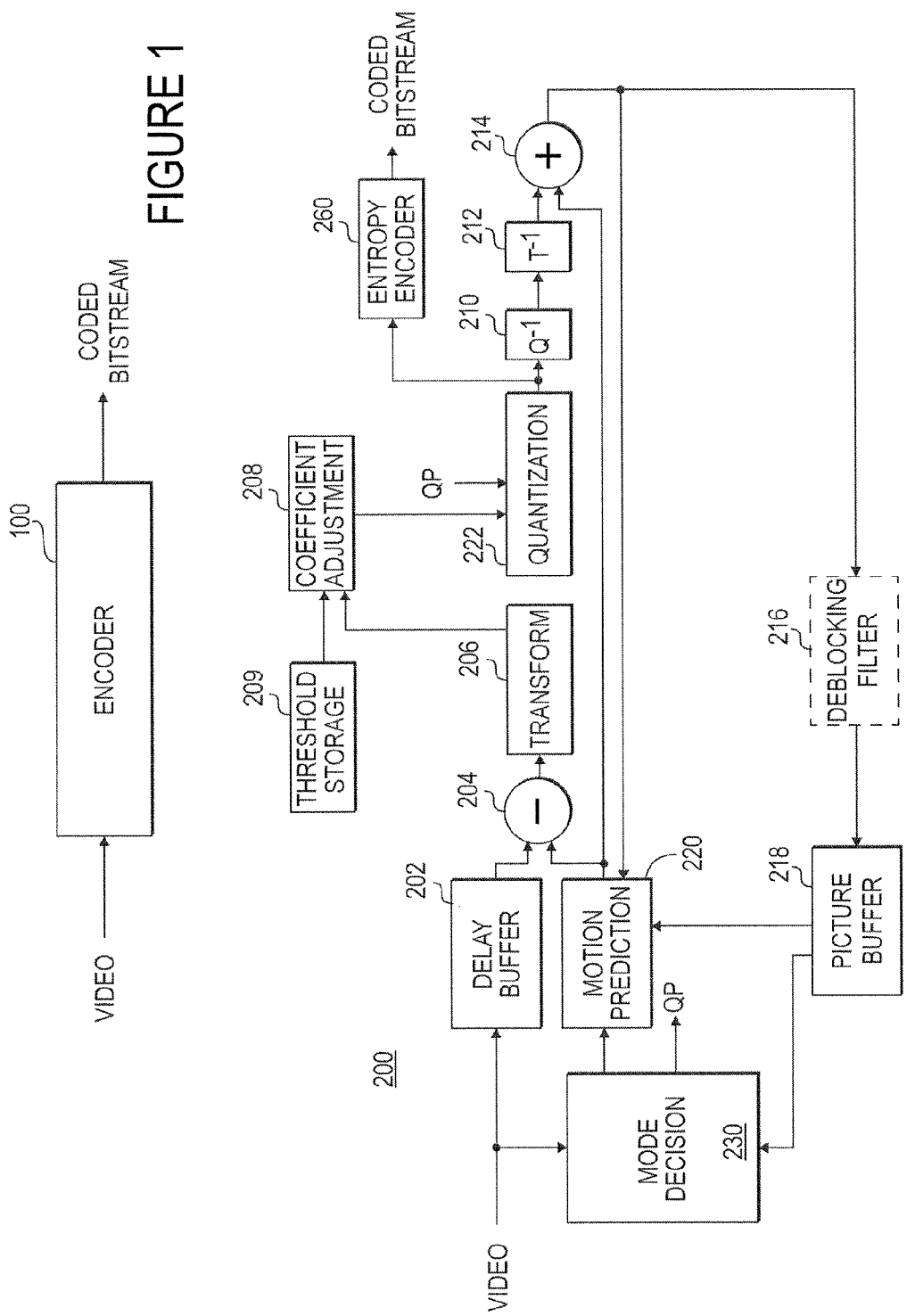

APPARATUSES AND METHODS FOR ADJUSTING COEFFICIENTS USING DEAD ZONES

TECHNICAL FIELD

Embodiments of this invention relate generally to video encoding, and examples of systems and methods for adjusting coefficients using dead zones are described.

BACKGROUND

Video or other media signals may be used by a variety of devices, including televisions, broadcast systems, mobile devices, and both laptop and desktop computers. Typically, devices may display video in response to receipt of video or other media signals, often after decoding the signal from an encoded form. Video signals provided between devices are often encoded using one or more of a variety of encoding and/or compression techniques, and video signals are typically encoded in a manner to be decoded in accordance with a particular standard, such as MPEG-2, MPEG-4, and H.264/MPEG-4 Part 10. By encoding video or other media signals, then decoding the received signals, the amount of data provided between devices may be significantly reduced.

Video encoding typically proceeds by sequentially encoding macroblocks, or other coding units, of video data. Prediction coding may be used to generate predictive blocks and residual blocks, where the residual blocks represent a difference between a predictive block and the block being coded. Prediction coding may include spatial and/or temporal predictions to remove redundant data in video signals, thereby further improving data compression. Intracoding for example, is directed to spatial prediction and reducing the amount of spatial redundancy between blocks in a frame or slice. Intercoding, on the other hand, is directed toward temporal prediction and reducing the amount of temporal redundancy between blocks in successive frames or slices. Intercoding may make use of motion prediction to track movement between corresponding blocks of successive frames or slices.

Typically, in encoder implementations, including intracoding and intercoding based implementations, residual blocks (e.g., difference between actual and predicted blocks) may be transformed and/or quantized, and entropy encoded to generate a coded bitstream. The coded bitstream may be transmitted between the encoding device and the decoding device. Quantization may determine the amount of loss that may occur during the encoding of a video signal. That is, the amount of data that is removed from a video signal during an encoding process may depend on a quantization parameter.

Standard encoding methodologies (e.g. H.264, MPEG, etc.) may specify an available range of QP, a parameter used to determine quantization. This range may limit the available amount of quantization achievable with a video encoder. In general, a higher QP value may result in a greater degree of quantization, and therefore fewer bits in the quantized bitstream. Providing a maximum QP in an encoding standard, however, may limit the amount of bit reduction available, even if further bit reduction may be acceptable from a quality perspective.

BRIEF DESCRIPTION OF THE DRAWINGS

FIG. 1 is a block diagram of an encoder according to an embodiment of the present invention.

FIG. 2 is a block diagram of an encoder according to an embodiment of the present invention.

DETAILED DESCRIPTION

Figure 3:
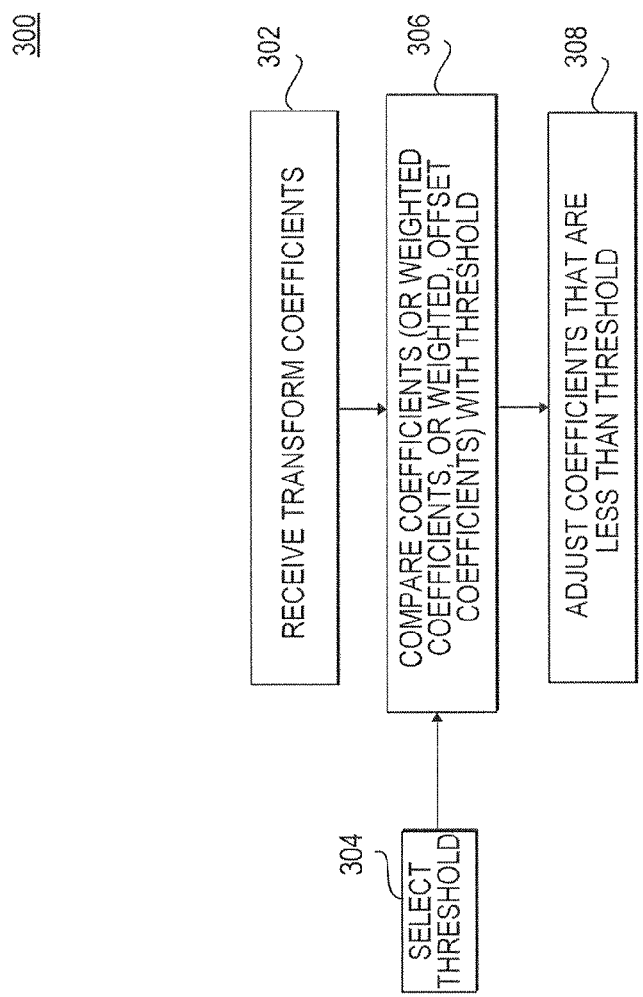
FIG. 3 is a flowchart of a method for adjusting coefficients according to an embodiment of the present invention.

Examples of apparatuses and methods for providing adjusted coefficients using dead zones are described herein. By utilizing dead zones, an effective quantization range of a video encoder may be extended. For example, dead zones may be used to set coefficients that are within the dead zone to zero, such that zero bits in a bitstream may be associated with that coefficient. Accordingly, a greater number of bits may be available for allocation to other coefficients. This may be analogous to a situation where a greater QP range had been available for use. In this manner, QP range may be extended and may be considered a virtual QP range. Certain details are set forth below to provide a sufficient understanding of embodiments of the invention. However, it will be clear to one having skill in the art that embodiments of the invention may be practiced without these particular details, or with additional or different details. Moreover, the particular embodiments of the present invention described herein are provided by way of example and should not be used to limit the scope of the invention to these particular embodiments. In other instances, well-known video components, encoder or decoder components, circuits, control signals, timing protocols, and software operations have not been shown in detail in order to avoid unnecessarily obscuring the invention.

FIG. 1 is a block diagram of an apparatus in the form of an encoder 100 according to an embodiment of the invention. The encoder 100 may include one or more logic circuits, control logic, logic gates, processors, memory, and/or any combination or sub-combination of the same, and may be configured to encode and/or compress a video signal using one or more encoding techniques, examples of which will be described further below. The encoder 100 may be configured to encode, for example, a variable bit rate signal and/or a constant bit rate signal, and generally may operate at a fixed rate to output a bitstream that may be generated in a rate-independent manner. The encoder 100 may be implemented in any of a variety of devices employing video encoding, including, but not limited to, televisions, broadcast systems, mobile devices, and both laptop and desktop computers.

In at least one embodiment, the encoder 100 may include an entropy encoder, such as a variable-length coding encoder (e.g., Huffman encoder or CAVLC encoder), and/or may be configured to encode data, for instance, at a macroblock level. Each macroblock may be encoded in intra-coded mode, inter-coded mode, bidirectionally, or in any combination or sub-combination of the same. Other coding units may also be used.

By way of example, the encoder 100 may receive and encode a video signal that includes a plurality of sequentially ordered coding units (e.g., block, macroblock, slice, frame, field, group of pictures, sequence). The video signal may be encoded in accordance with one or more encoding standards, such as MPEG-2, MPEG-4, H.263, H.264, H.265, and/or HEVC, to provide a coded bitstream. The coded bitstream may in turn be provided to a data bus and/or to a device, such as a decoder or transcoder (not shown in FIG. 1). A video signal may include a transient signal, stored data, or both.

To encode each macroblock (or other coding unit) of a video signal, the encoder may utilize a standard mode decision process and identify a standard quantization parameter. The quantization parameter may, for instance, be provided from an external device and/or a user or may be generated by the encoder 100. The quantization parameter may be identified in accordance with any suitable encoding methodologies, including those directed to rate control and/or adaptive quantization. Accordingly a rate control unit and/or an adaptive quantization unit may be provided in communication with the encoder 100. As will be explained, the encoder 100 may adjust coefficients used to encode a macroblock by eliminating, reducing, or setting to zero, certain coefficients. In some examples, coefficients may be generated in accordance with the standard quantization parameter, and the coefficients having a magnitude within a dead zone (e.g. below a particular value) may be set to zero. Modifying coefficients using a deadzone may improve an ability of the encoder to utilize bits in a bitstream for more meaningful data.

FIG. 2 is a block diagram of an encoder 200 according to an embodiment of the present invention. The encoder 200 may be used to implement, at least in part, the encoder 100 of FIG. 1, and may further be compliant with one or more known coding standards, such as MPEG-2, H.264, and H.265 coding standards.

The encoder 200 may include a mode decision block 230, a motion prediction block 220, a delay buffer 202, a subtractor 204, a transform 206, a coefficient adjustment block 208, a quantization block 222, an entropy encoder 260, an inverse quantization block 210, an inverse transform block 212, an adder 214, an optional deblocking filter 216, and a decoded picture buffer 218. The mode decision block 230 may receive an incoming video signal (e.g. a transient signal or stored data from a memory) and may determine an appropriate coding mode for the video signal based on properties of the video signal and a decoded picture buffer signal. The mode decision block may determine an appropriate coding mode on a per frame and/or macroblock basis. The mode decision may include macroblock type, intra modes, inter modes, syntax elements (e.g., motion vectors), and/or one or more quantization parameters.

The output of the mode decision block 230 may be utilized by the motion prediction block 220 to generate a predictor in accordance with one or more coding standards and/or other prediction methodologies. The predictor may be subtracted from a delayed version of the video signal at the subtractor 204. Using the delayed version of the video signal may provide time for the mode decision block 230 to act. The output of the subtractor 204 may be a residual, e.g. the difference between a block and a prediction for a block.

The transform 206 may perform a transform, such as a discrete cosine transform (DCT), on the residual to transform the residual to the frequency domain. As a result, an output of the transform 206 may be a block of coefficients that may, for instance, correspond to spectral components of data in the video signal. For example, the block of coefficients may include a DC coefficient corresponding to a zero frequency component of the video signal. The DC coefficient may, for instance, represent an average value of the coefficient block. The block of coefficients may further include one or more AC coefficients corresponding to higher (non-zero) frequency portions of the video signal.

The coefficient adjustment block 208 may receive the block of coefficients from the transform 206. The coefficient adjustment block 208 may adjust the coefficients prior to quantization. The coefficients may be adjusted by reducing the value of coefficients which are below a threshold value. In some examples, coefficients in the block of coefficients which are below a threshold value may be reset to zero. One or more thresholds for use by the coefficient adjustment block 208 may be received by the coefficient adjustment block 208 from another component of the encoder 200 and/or may be stored in threshold storage 209. The threshold storage may be implemented using any storage device, and may store one or more threshold values for use in adjusting coefficients by the coefficient adjustment block 208. In some examples the threshold value or values may be adjusted on a per coefficient, per block, or per macroblock basis. Accordingly, the coefficient adjustment block 208 may take action to reduce or zero out coefficients on a per coefficient, per block, or per macroblock basis.

The threshold value accordingly may define a space below which coefficients of a block of coefficients may be set to zero. In this manner, the threshold value may be considered to define a dead zone. In some examples, the threshold value may be specified in a manner related to a quantization parameter Quant, which may be related to a QP range. In some examples, setting a threshold value equal to Quant/8 may have a performance effect comparable to increasing the QP by one. By extrapolating Quant values for QP values outside of the standard QP range, an extended QP range can be accomplished. For example, an encoder configured to operate in accordance with a QP range of 0 to 51 may be able to effectively operate with a QP range of 0 to 75 if a dead zone defined by Quant/8 for each QP value is used and is the same for all coefficients in a macroblock. In other examples, other fractions may be used to effectively extend a QP range. Generally, a threshold value may be selected which results in a desired effective increase in QP range.

In some examples, different threshold values may be used (and, optionally stored) for different components of a video signal. For example, different thresholds may be used for luma and chroma coefficients. The luma coefficients may be compared with one threshold (e.g. dead zone) while the chroma components may be compared with a different threshold (e.g. dead zone). In this manner, visual quality may be separately controlled for luma and chroma components, which separate control may not otherwise be allowed by a particular encoding standard used.

The coefficient adjustment block 208 may accordingly set to zero coefficients which fall within the dead zone, e.g. are less than the threshold value. The adjusted block of coefficients may be provided to the quantization block 222.

The quantization block 222 may receive the block of coefficients and quantize the coefficients (e.g., DC coefficient and AC coefficients) to produce a quantized coefficient block. The quantization provided by the quantization block 222 may be lossy and/or may also utilize one or more quantization parameters, such as QP and/or Quant, to employ a particular degree of quantization for one or more coefficients of the coefficient block. A quantization parameter may correspond with an amount of spatial detail preserved during a respective quantization process. QP may be received from the mode decision block 230, but it will be appreciated that in some instances, QP may be specified by a user, or may be provided by another element of the encoder 200. The quantization parameter QP may be adjusted for each macroblock, and/or may be based on information encoded by the encoder 200. By way of example, macroblocks associated with higher activity in one or more components may generally be associated with a larger quantization parameter. The range of quantization parameter QP may typically be set for a particular encoding methodology.

In some examples, a quantization process may be performed in accordance with the following relationship:

$$Coeff' = \frac{Coeff * W + Q_{ofs}}{Quant};$$

where Coeff' is an integer precision quantized coefficient (e.g. an output of the quantization block 222), Coeff is a transformed full precision coefficient (e.g. an output of the transform 206), W is a coefficient from a quantization table, $Q_{ofs}$ is a quantization offset, which may control a rounding process, and Quant is a QP-derived format-specific parameter. W may be specified by a particular encoding methodology (e.g. H.264, MPEG-2, etc.) or may by generated by encoders described herein. W may be advantageous in weighting coefficients by frequency—e.g. lower frequency coefficients may have a greater impact on visual quality and may be weighted heavier as specified in a W table. However, the W table generally would need to be provided from the encoder to the decoder for use in appropriate decoding. Accordingly, using W alone to adjust coefficients may disadvantageously have signaling overhead between the encoder and the decoder.

$Q_{ofs}$ is an offset related to rounding, and may be hard coded in encoders described herein or may be generated by the encoders described herein. Quant may be hard coded in encoders described herein or may be changed on a particular level, e.g. a frame level. In some examples, it may be advantageous to change the Quant value on a different level, e.g. on a macroblock level. Embodiments described herein may effectively allow for a change in Quant on a macroblock level by utilizing dead zones to zero out particular coefficients and effectively extend a QP range.

The quantization block 222 may perform the above calculation and/or the above calculation may be provided by a combination for the coefficient adjustment block 208 and the quantization block 222. For example, the coefficient adjustment block 208 may compare coefficients Coeff with one or more threshold values (e.g. dead zone(s)) to arrive at adjusted coefficients to use in the above equation. The adjusted coefficients may not include, or may include as zeros, coefficients which were less than the respective thresholds. In other examples, the coefficient adjustment block 208 may perform a calculation of the numerator of the above equation Coeff*W+$Q_{ofs}$ and compare the numerator with the threshold value(s) to arrive at adjusted numerator values to provide to the quantization block 222 for division by Quant. The adjusted numerator values (which may also be referred to as adjusted coefficients) may not include or may include as zeros numerator values which were less than the threshold(s). It is to be understood that the allocation of computations to the various components shown in FIG. 2 may be flexible.

One example of pseudocode which may be used by the coefficient adjustment block 208 and the quantization block 222 to provide adjusted coefficients is as follows:
coeff1=Coeff*W+$Q_{ofs}$
if (coeff1<DeadZone)
  Coeff'=0
Else
  Coeff'=coeff1/Quant Accordingly, the coefficient adjustment block 208 and the quantization block 222 may be implemented using software, e.g. executable instructions encoded on one or more memory devices and executed by one or more processing units (e.g. processors).

The entropy encoder 260 may encode the quantized coefficient block to provide a coded bitstream. The entropy encoder 260 may be any entropy encoder known by those having ordinary skill in the art or hereafter developed, such as a variable length coding (VLC) encoder or a context-adaptive binary arithmetic coding (CABAC) encoder. The quantized coefficient block may also be inverse-quantized by the inverse quantization block 210. The inverse-quantized coefficients may be inverse transformed by the inverse transform block 212 to produce a reconstructed residual, which may be added to the predictor at the adder 214 to produce reconstructed video. The reconstructed video may be deblocked by the optional deblocking filter 216, which is specified in some encoding standards, and provided to the decoded picture buffer 218 for use in future frames, and further may be provided from the decoded picture buffer 218 to the mode decision block 230 for further in-macroblock intra prediction or other mode decision methodologies.

The encoder 200 may operate in accordance with one or more video coding standards, such as H.264. In examples employing coding standards, such as H.264, which employ motion prediction and/or compensation, the encoder 200 may further include a feedback loop having an inverse quantization block 210, an inverse transform 212, and a reconstruction adder 214, a deblocking filter 216, and a picture buffer 218. These elements may mirror elements included in a decoder (not shown) that reverse, at least in part, the encoding process performed by the encoder 200. Additionally, the feedback loop of the encoder may include a prediction block 220 and a decoded picture buffer 218.

In an example operation of the encoder 200, a video signal (e.g. a base band video signal) may be provided to the encoder 200. The video signal may be provided to the delay buffer 202 and the mode decision block 230. The mode decision block 230 may receive a quantization parameter, for instance, from an external device, and may provide the parameter to the quantization block 222. In some examples, the quantization parameter QP may be provided directly to the quantization block 222. Similarly, other quantization parameters such as W, $Q_{ofs}$, and Quant, may be provided to the quantization block 222, the coefficient adjustment block 208, and/or may be generated by the encoder 200. The subtractor 204 may receive the video signal from the delay buffer 202 and may subtract a motion prediction signal from the video signal to generate a residual signal. The residual signal may be provided to the transform 206 and processed using a forward transform, such as a DCT. As described, the transform 206 may generate a coefficient block that may be provided to the coefficient adjustment block 208, and the coefficient adjustment block 208, together with the quantization block 222, may adjust and quantize the coefficients. In some examples, coefficients having less than a threshold value (e.g. in a dead zone) may be zeroed out. Quantized coefficients may be provided to the entropy encoder 260 and thereby encoded into a coded bitstream.

The quantized coefficient block may further be provided to the feedback loop of the encoder 200. That is, the quantized coefficient block may be inverse quantized and inverse transformed by the inverse quantization block 210 and the inverse transform 212, respectively, to produce a reconstructed residual. The reconstructed residual may be added to the predictor at the adder 214 to produce reconstructed video, which may be deblocked by the deblocking filter 216, written to the decoded picture buffer 218 for use in future frames, and fed back to the mode decision block 230 and the motion prediction block 220. Based, at least in part, on the reconstructed video signals, the motion prediction block 220 may provide a motion prediction signal to the adder 204.

Accordingly, the encoder 200 of FIG. 2 may provide a coded bitstream based on a video signal, where the coded bitstream is generated in part using adjusted coefficients provided in accordance with embodiments of the present invention. The encoder 200 may be operated in semiconductor technology, and may be implemented in hardware, software, or combinations thereof. In some examples, the encoder 200 may be implemented in hardware with the exception of the mode decision block 230 that may be implemented in software. In other examples, other blocks may also be implemented in software, including the coefficient adjustment block 208 and the quantization block 222, however software implementations in some cases may not achieve real-time operation.

FIG. 3 is a flowchart illustrating an example method of adjusting coefficients in accordance with embodiments of the present invention. The method 300 includes receiving transform coefficients at 302, selecting a threshold at 304, comparing the coefficients (or weighted coefficients, or weighted, offset coefficients) with the threshold at 306, and adjusting the coefficients which are less than the threshold at 308. In this manner, adjusted coefficients may be provided for quantization.

The acts depicted in FIG. 3 may be performed, for example, by the coefficient adjustment block 208 and/or the quantization block 222 of FIG. 2.

In 302, transform coefficients may be received. The coefficients may be received from a transform, e.g. the transform 206 of FIG. 2. In 304, a threshold may be selected. The threshold may be selected by, for example, accessing a stored threshold from a threshold storage. In some example the stored threshold, and/or the selected threshold, may be calculated based on a desired increase in effective QP. A threshold may be selected which corresponds with an increased QP range in terms of a number of bits available to encode the video signal. By zeroing out certain coefficients as described herein, a greater number of bits may be available to encode portions of the video signal corresponding to other coefficients, which may yield an effectively larger QP range. In some examples, a threshold is selected which is equal to Quant/8 which corresponds to the extended QP value. So, for example for H.264, Quant is doubled in value everytime QP is increased by 6. So applying threshold of $Quant_{[QP=51]}*2/8$ will perform quantization comparable to QP 57.

In 306, the coefficients may be compared with the selected threshold. In some examples, weighted coefficients (e.g. W*Coeff, as described herein) may be used in the comparison. In other examples, weighted, offset coefficients (e.g. $W*Coeff+Q_{ofs}$) may be used in the comparison. In some examples, 304 and 306 may occur separately for separate components of a video signal, e.g. luma and chroma. So, for example, 304 and 306 may be performed utilizing one particular selected threshold for the luma components and 304 and 306 may be performed utilizing a different selected threshold for the chroma components. In this manner, the threshold selected in 304 may be selected based on the component of the video signal.

In 308, coefficients which are found to be less than the threshold may be adjusted (e.g. may be reduced and/or set to zero). In this manner, fewer bits may be utilized to encode portions of the video signal corresponding to the reduced or zeroed coefficients, and more bits may be available to encode other portions, which may improve quality. In some examples, a rate control and/or adaptive quantization unit may be utilized to ensure the threshold is not too high to adversely affect the video quality (e.g. too many coefficients zeroed out). So for example, a rate control and/or adaptive quantization block may evaluate the video signal generated utilizing the adjusted coefficients of 308 and may revise the selected threshold 304 if a number of adjusted coefficients was greater than a particular limit. The adjusted coefficients may then be quantized (e.g. divided by Quant).

One or more steps of the method 300 may be omitted in some examples. For example, the method 300 may be performed without explicitly selecting the threshold 304, which may be hardcoded in an encoder. Moreover, portions of the method 300 may be performed separately, sequentially, and/or concurrently, and may be performed by the quantization block 222, the coefficient adjustment block 208, or combinations of those blocks, as described, or may partially or fully be performed by one or more other components of an encoder.

One or more of the methods described herein and/or any pseudocode described herein, may be implemented as computer executable instructions stored on computer readable media and/or executed on one or more processors or processor cores. Computer readable media may include any form of computer readable storage or computer readable memory, transitory or non-transitory, including but not limited to externally or internally attached hard disk drives, solid-state storage (such as NAND flash or NOR flash media), tiered storage solutions, storage area networks, network attached storage, and/or optical storage.

Figure 4:
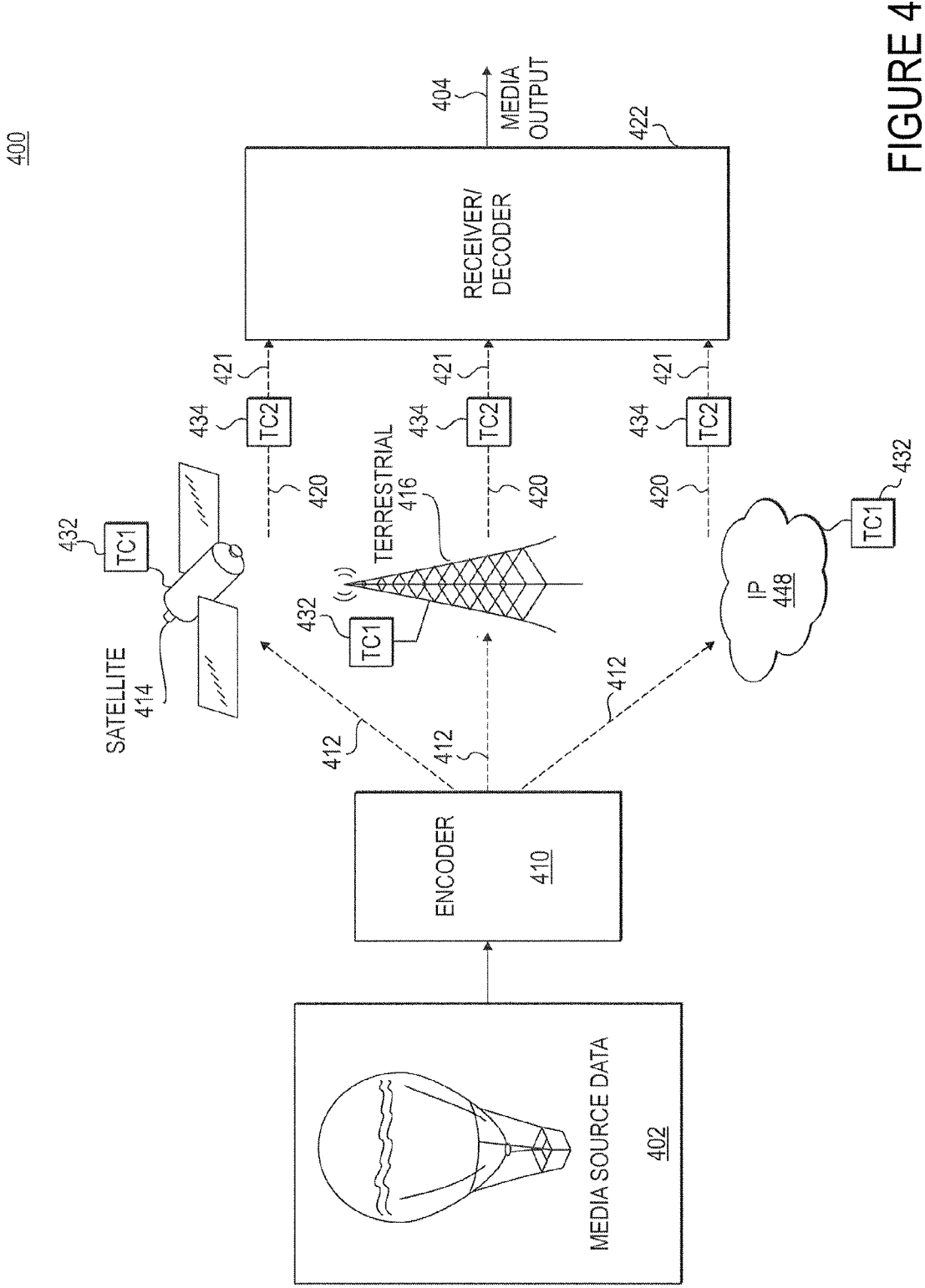
FIG. 4 is a schematic illustration of a media delivery system according to an embodiment of the invention.

FIG. 4 is a schematic illustration of a media delivery system 400 in accordance with embodiments of the present invention. The media delivery system 400 may provide a mechanism for delivering a media source 402 to one or more of a variety of media output(s) 404. Although only one media source 402 and media output 404 are illustrated in FIG. 4, it is to be understood that any number may be used, and examples of the present invention may be used to broadcast and/or otherwise deliver media content to any number of media outputs.

The media source data 402 may be any source of media content, including but not limited to, video, audio, data, or combinations thereof. The media source data 402 may be, for example, audio and/or video data that may be captured using a camera, microphone, and/or other capturing devices, or may be generated or provided by a processing device. Media source data 402 may be analog or digital. When the media source data 402 is analog data, the media source data 402 may be converted to digital data using, for example, an analog-to-digital converter (ADC). Typically, to transmit the media source data 402, some type of compression and/or encryption may be desirable. Accordingly, an encoder 410 may be provided that may encode the media source data 402 using any encoding method in the art, known now or in the future, including encoding methods in accordance with video standards such as, but not limited to, MPEG-2, MPEG-4, H.264, H.HEVC, or combinations of these or other encoding standards. The encoder 410 may be implemented using any encoder described herein, including the encoder 100 of FIG. 1 and the encoder 200 of FIG. 2.

The encoded data 412 may be provided to a communications link, such as a satellite 414, an antenna 416, and/or a network 448. The network 448 may be wired or wireless, and further may communicate using electrical and/or optical transmission. The antenna 416 may be a terrestrial antenna, and may, for example, receive and transmit conventional AM and FM signals, satellite signals, or other signals known in the art. The communications link may broadcast the encoded data 412, and in some examples may alter the encoded data 412 and broadcast the altered encoded data 412 (e.g. by re-encoding, adding to, or subtracting from the encoded data 412). The encoded data 420 provided from the communications link may be received by a receiver 422 that may include or be coupled to a decoder. The decoder may decode the encoded data 420 to provide one or more media outputs, with the media output 404 shown in FIG. 4.

The receiver 422 may be included in or in communication with any number of devices, including but not limited to a modem, router, server, set-top box, laptop, desktop, computer, tablet, mobile phone, etc.

The media delivery system 400 of FIG. 4 and/or the encoder 410 may be utilized in a variety of segments of a content distribution industry.

Figure 5:
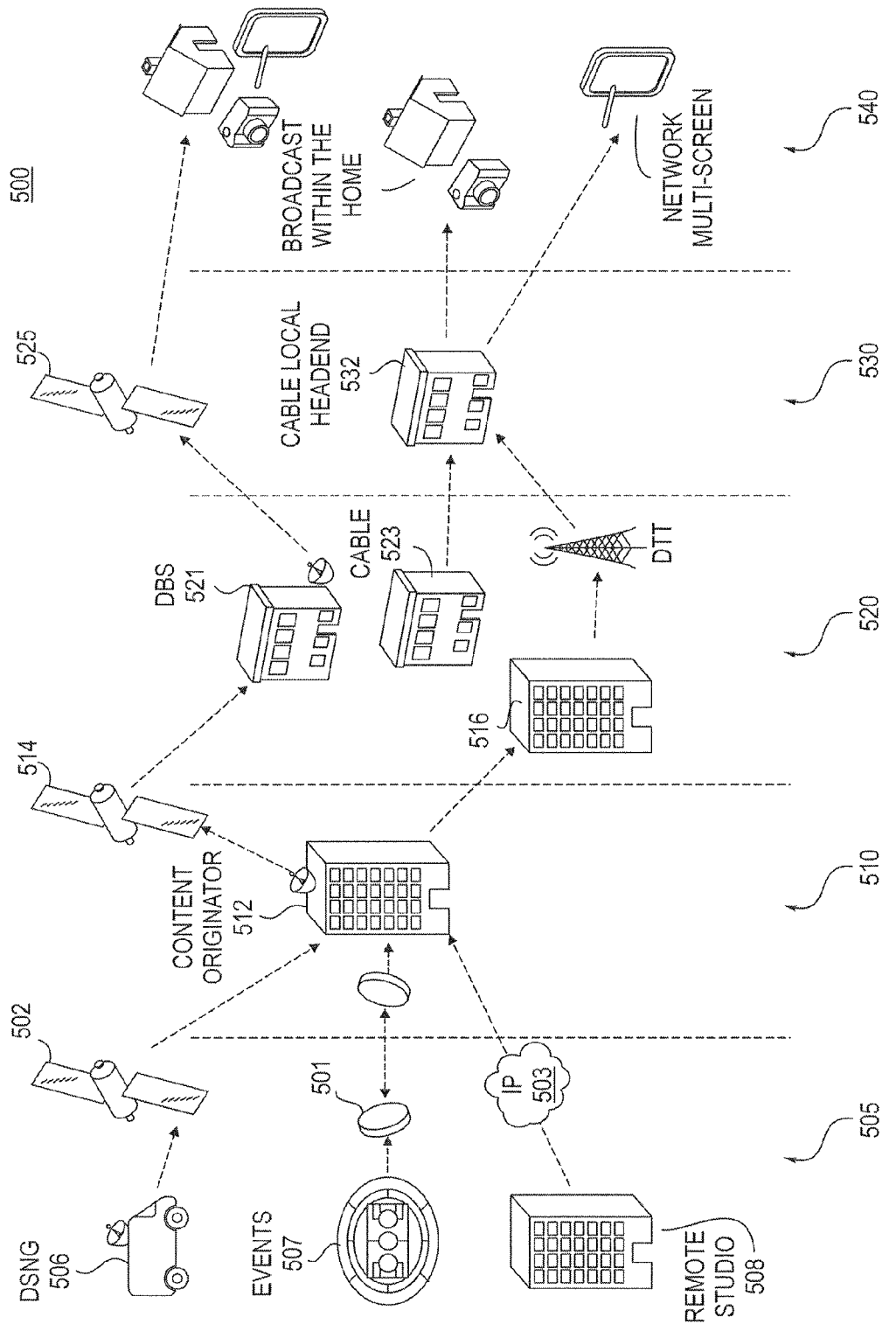
FIG. 5 is a schematic illustration of a video distribution system that may make use of encoders described herein.

FIG. 5 is a schematic illustration of a video distribution system that 500 may make use of encoders described herein. The video distribution system 500 includes video contributors 505. The video contributors 505 may include, but are not limited to, digital satellite news gathering systems 506, event broadcasts 507, and remote studios 508. Each or any of these video contributors 505 may utilize an encoder described herein, such as the encoder 410 of FIG. 4, to encode media source data and provide encoded data to a communications link. The digital satellite news gathering system 506 may provide encoded data to a satellite 502. The event broadcast 507 may provide encoded data to an antenna 501. The remote studio 508 may provide encoded data over a network 503.

A production segment 510 may include a content originator 512. The content originator 512 may receive encoded data from any or combinations of the video contributors 505. The content originator 512 may make the received content available, and may edit, combine, and/or manipulate any of the received content to make the content available. The content originator 512 may utilize encoders described herein, such as the encoder 410 of FIG. 4, to provide encoded data to the satellite 514 (or another communications link). The content originator 512 may provide encoded data to a digital terrestrial television system 516 over a network or other communication link. In some examples, the content originator 512 may utilize a decoder to decode the content received from the contributor(s) 505. The content originator 512 may then re-encode data and provide the encoded data to the satellite 514. In other examples, the content originator 512 may not decode the received data, and may utilize a transcoder to change an encoding format of the received data.

A primary distribution segment 520 may include a digital broadcast system 521, the digital terrestrial television system 516, and/or a cable system 523. The digital broadcasting system 521 may include a receiver, such as the receiver 522 described with reference to FIG. 5, to receive encoded data from the satellite 514. The digital terrestrial television system 516 may include a receiver, such as the receiver 422 described with reference to FIG. 4, to receive encoded data from the content originator 512. The cable system 523 may host its own content which may or may not have been received from the production segment 510 and/or the contributor segment 505. For example, the cable system 523 may provide its own media source data 502 as that which was described with reference to FIG. 4.

The digital broadcast system 521 may include an encoder, such as the encoder 410 of FIG. 4, to provide encoded data to the satellite 525. The cable system 523 may include an encoder, such as the encoder 410 of FIG. 4, to provide encoded data over a network or other communications link to a cable local headend 532. A secondary distribution segment 530 may include, for example, the satellite 525 and/or the cable local headend 532.

The cable local headend 532 may include an encoder, such as the encoder 410 of FIG. 4, to provide encoded data to clients in a client segment 540 over a network or other communications link. The satellite 525 may broadcast signals to clients in the client segment 540. The client segment 540 may include any number of devices that may include receivers, such as the receiver 422 and associated decoder described with reference to FIG. 4, for decoding content, and ultimately, making content available to users. The client segment 540 may include devices such as set-top boxes, tablets, computers, servers, laptops, desktops, cell phones, etc.

Accordingly, encoding, transcoding, and/or decoding may be utilized at any of a number of points in a video distribution system. Embodiments of the present invention may find use within any, or in some examples all, of these segments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An encoder, comprising:
    a transform configured to transform a portion of a video signal into a plurality of coefficients;
    a coefficient adjustment block configured to set to zero certain coefficients of the plurality of coefficients based on a comparison with a threshold, wherein a number of bits available to encode the portion of the video signal is based at least in part on a number of the certain coefficients that are set to zero; and
    a quantization block configured to receive adjusted coefficients from the coefficient adjustment block and quantize the coefficients.

2. The encoder of claim 1, wherein the coefficient adjustment block is configured to compare the coefficients with the threshold.

3. The encoder of claim 1, wherein the coefficient adjustment block is configured to compare weighted coefficients with the threshold.

4. The encoder of claim 1, wherein the coefficient adjustment block is configured to compare weighted, offset coefficients with the threshold.

5. The encoder of claim 1, wherein the threshold is selected based on a desired increase in quantization parameter (QP) range.

6. The encoder of claim 5, wherein the threshold is a same threshold for all coefficients of a macroblock of the video signal.

7. The encoder of claim 6, wherein a threshold of Quant/8 corresponds with an increase of one in quantization parameter (QP) range.

8. The encoder of claim 1, wherein the coefficient adjustment block is configured to separately adjust coefficients for luma and chroma components of a video signal.

9. The encoder of claim 1, wherein the coefficient adjustment block is configured to retrieve the threshold from threshold storage.

10. A method comprising:
    receiving a video signal;
    transforming at least a portion of the video signal to generate a plurality of coefficients;
    setting to zero certain coefficients of the plurality of coefficients based on a comparison with a threshold;
    quantizing the adjusted coefficients; and
    encoding the portion of the video signal, wherein a number of bits available to encode the portion of the video signal is based at least in part on a number of the certain coefficients that are set to zero.

11. The method of claim 10, wherein the comparison with the threshold comprises a comparison of the plurality of coefficients with the threshold.

12. The method of claim 10, further comprising weighting the coefficients to provide weighted coefficients and wherein the comparison with the threshold comprises a comparison of the weighted coefficients with the threshold.

13. The method of claim 10, further comprising weighting and offsetting the coefficients to provide weighted offset coefficients and wherein the comparison with the threshold comprises comparison of the weighted offset coefficients with the threshold.

14. The method of claim 10, wherein the coefficients correspond with chroma components of a video signal, and wherein the threshold is a first threshold, the method further comprising adjusting additional selected coefficients corresponding with luma components of the video signal based on a comparison with a second threshold, wherein the second threshold is different than the first threshold.

15. The method of claim 10, wherein the plurality of coefficients correspond to a macroblock of the video signal.

16. The method of claim 10 further comprising selecting the threshold based on a desired increase in quantization parameter (QP) range of an encoder.

17. The method of claim 10 wherein setting to zero the certain coefficients effectively extends a quantization parameter (QP) range of a video encoder.

18. The method of claim 10 wherein the threshold is specified per macroblock, per block, or per coefficient of the plurality of coefficients.

* * * * *